United States Patent
Shao et al.

(10) Patent No.: US 7,746,769 B2
(45) Date of Patent: Jun. 29, 2010

(54) MANAGEMENT OF REDUNDANT AND MULTI-SEGMENT PSEUDO-WIRE

(75) Inventors: Suyan Shao, Ottawa (CA); Tibor Fasanga, Stittsville (CA); Guangnian Wu, Ottawa (CA)

(73) Assignee: Alcatel Lucent, Parris (FR)

( * ) Notice: Subject to any disclaimer, the term of this patent is extended or adjusted under 35 U.S.C. 154(b) by 583 days.

(21) Appl. No.: 11/727,299

(22) Filed: Mar. 26, 2007

(65) Prior Publication Data
US 2008/0240101 A1    Oct. 2, 2008

(51) Int. Cl.
   *H04J 3/14*      (2006.01)
   *H04J 1/16*      (2006.01)
   *G06F 15/173*    (2006.01)

(52) U.S. Cl. ............... 370/228; 370/244; 370/248; 709/239

(58) Field of Classification Search ............ None
See application file for complete search history.

(56) References Cited

U.S. PATENT DOCUMENTS

| | | | |
|---|---|---|---|
| 5,926,463 A | 7/1999 | Ahearn et al. | |
| 2004/0261116 A1 | 12/2004 | Mckeown | |
| 2006/0047851 A1* | 3/2006 | Voit et al. | 709/239 |
| 2007/0008982 A1* | 1/2007 | Voit et al. | 370/401 |
| 2007/0011352 A1* | 1/2007 | Martini et al. | 709/239 |
| 2008/0089227 A1* | 4/2008 | Guichard et al. | 370/228 |
| 2008/0095061 A1* | 4/2008 | Hua et al. | 370/248 |
| 2008/0175234 A1* | 7/2008 | Li | 370/389 |
| 2008/0225864 A1* | 9/2008 | Aissaoui et al. | 370/401 |
| 2008/0253367 A1* | 10/2008 | Ould-Brahim | 370/389 |
| 2009/0010182 A1* | 1/2009 | Tochio | 370/254 |
| 2009/0168783 A1* | 7/2009 | Mohan et al. | 370/395.5 |

FOREIGN PATENT DOCUMENTS

WO    WO 0052896    8/2000

* cited by examiner

*Primary Examiner*—Ricky Ngo
*Assistant Examiner*—Clemence Han
(74) *Attorney, Agent, or Firm*—Kramer & Amado P.C.

(57) ABSTRACT

A system and method of managing redundant and multi-segment pseudo-wire, including calculating two aggregated endpoints with two or more local endpoints, at least one local endpoint being a backup endpoint, mapping the aggregated endpoints and a plurality of nodes interconnected with one another and the local endpoints, determining an overall status of the system and setting an overall status indicator, determining an operational status of individual components in the system and setting associated status indicators.

15 Claims, 6 Drawing Sheets

MANAGEMENT OF REDUNDANT AND MULTI-SEGMENT PSEUDO-WIRE

BACKGROUND OF THE INVENTION

1. Field of the Invention

This invention relates generally to management of redundant and multi-segment pseudo-wire.

2. Description of Related Art

A packet switched network (PSN), refers to the packet switched networks that existed before the Internet. A virtual leased line or virtual lease line (VLL) is a way to provide Ethernet, frame relay and Asynchronous Transfer Mode (ATM) based point to point communication over certain types of networks, including a PSN. A VLL uses psuedo-wire (PW) encapsulation for transporting Ethernet traffic. Thus, in computer networking and telecommunications, a PW is an emulation of a native service over a PSN.

The PW emulates the operation of a "transparent wire" carrying the native service, but this emulation will rarely be perfect. Multi-segment PW, redundant PW, or a combination of multi-segment PW and redundant PW are implemented in many service deployment scenarios. The imperfections inherent in PW emulations of transparent wire carrying the native service mean that management of such scenarios is needed.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation or combination of disclosed exemplary embodiments which may be apparent to those skilled in the art. Accordingly, the present invention resides in the novel methods, arrangements, combinations and improvements herein shown and described in various exemplary embodiments.

SUMMARY OF THE INVENTION

In light of the present need for management of redundant and multi-segment PW, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Multi-segment PW, redundant PW, or a combination of multi-segment PW and redundant PW are implemented in many service deployment scenarios. Examples of deployment scenarios where PW is beneficial include the circumstance where terminating provider edges (PEs) such as edge nodes resides between two distinct PW control planes or PSN domains. The PW control planes may belong to independent and autonomous systems. Alternatively, the PSN technology may be heterogonous. Likewise, it is sometimes beneficial to aggregate a PW at a specific PSN point.

Sometimes PW packet data units are switched from one PW to another PW without changing the overall PW payload. However, sometimes is not possible, not desirable, or not otherwise feasible to establish a PW control channel between ultimate source and destination PEs.

In order to establish a PW control channel, a remote ultimate PE Internet protocol (IP) address is known. Similarly, the specifics of how a remote ultimate PE IP address is reached are known in establishing a PW control channel. A local ultimate PE may not have access to information related to topology, operational or security constraints. Thus, a local ultimate PE may not have access to the remote ultimate PE IP address or the specifics regarding reaching that address.

In redundant PW, it is believed that a single-segment PW can be protected by the PSN. However, for implementations employing multi-segment PW or multi-homed customer edge routers (CE) it is believed that the failure of the access (attachment circuit) or the terminating PEs cannot be protected by the PSN.

It is believed that the provisioning of a redundant service implemented in multiple homes is fairly complicated and error prone unless it includes a centralized tool and/or a full view of the all the segments of PW. Thus, it is advantageous to have an indication of the overall state of the service and to have an indication of minor faults such as operational flags associated with the presence or absence of minor faults. Both an indication of overall state of the service and an indication of minor faults are believed to be beneficial for monitoring the health of the service. A supplementary feature is a fully automated operation, administration and maintenance (OAM) function to validate the end-to-end or per-segment connectivity. This is believed to reduce the amount of time necessary to isolate and identify a fault.

A VLL service site can have up to two named local endpoints. A local endpoint is essentially a combination of one service access point (SAP) and a binding or a group of bindings. In this context, an SAP with an optional inter-chassis backup (ICB) binding is a local access endpoint and a group of bindings without an SAP is a local network endpoint.

An endpoint can be created without any SAP or service distribution point (SDP) binding associated with it. In other words, an empty endpoint can be created. Similarly, an SAP or SDP binding can exist without being associated to an endpoint.

A primary or redundant binding is a regular spoke SDP binding. Sometimes, up to four of the spoke bindings form a VLL instance network endpoint. Usually, only one binding is configured as the primary. Thus, where four of the spoke bindings form a VLL instance network endpoint, up to 3 others can only be configured as redundant spokes.

Some redundant spokes have a precedence value to decide which one is next in line. Thus, only the terminating VLL instance is capable of having multiple bindings on the network side endpoint, in a typical application. Typically a switching VLL instance doesn't have more than two bindings, one on each side.

Inter-chassis backup (ICB) is used in conjunction with a redundant SAP to provide protection for the SAP. An ICB is in the endpoint with a protected SAP. Network traffic is carried over ICB to the other SAP (on the second PE) when the local SAP becomes unavailable. Thus, ICB is a temporary backup that occurs when the redundant SAP's state is switching. A binding can have the dual role of an ICB binding.

Topologically connected is defined herein to refer to a system where there cannot be two segments of sites which are not connected. For the embodiments described below, the service is topologically connected by virtue of a bi-directional PW connection between the two VLL sites. Where there is a spoke SDP binding only in one direction between two sites, the two sites are not topologically connected. When a second SDP binding is created in the other direction, the two sites are then topologically connected.

For the embodiments described below, the service topology is completed so that traffic flows from one end to another and vice versa. It is possible to divide the SAPs into two logical groups called global endpoints. All of the connections between sites of the same group are ICB connections. In a complete VLL topology each SAP belongs to one of the two global endpoints of the service.

Some local endpoints are explicitly created. Other local endpoints are implicit endpoints, such as default endpoints.

Local endpoints can also be access endpoints. Access endpoints have SAP and an optional ICB spoke SDP binding. Other local endpoints are network endpoints. Network endpoints have one or more spokes and they do not have SAP.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

The subject matter described herein relates to the management of the status of redundant services. This includes multi-segment tests. This also includes the configuration of the service. In this context, the reference to redundant service means many topologies exist. Multiple nodes exist serving as endpoints. Some of the nodes serving as endpoints exist as backups for other nodes serving as endpoints.

A calculation is made aggregating the status of endpoints. This will be described in greater detail below. Thus, the service switches from one node to another node acting as an endpoint while the aggregated endpoint remains the same.

Figure 1:
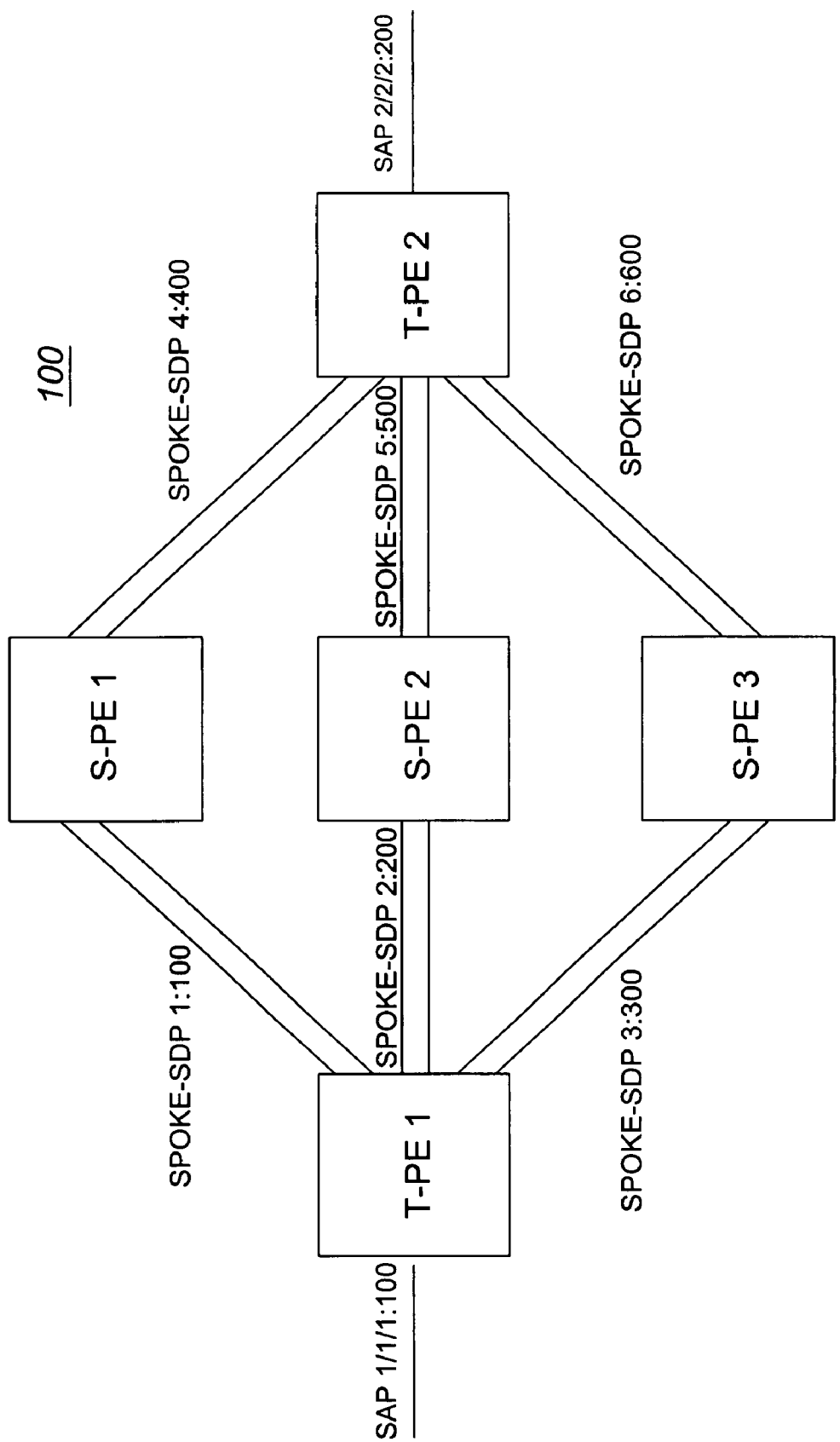
FIG. 1 shows a schematic diagram of an exemplary combination of endpoint and SAP supported on a VLL service site.

Referring now to the drawings, in which like numerals refer to like components or steps, there are disclosed broad aspects of various exemplary embodiments. FIG. 1 is a schematic diagram 100 showing an exemplary combination of endpoint and SAP supported on a VLL site. The exemplary combination of endpoint and SAP, SDP binding shown in schematic diagram 100 depict one endpoint with SDP bindings and one endpoint with SAP. This is depicted set up on PE nodes. There are up to four spokes and one ICB.

Other combinations of endpoint and SAP, SDP bindings supported on each VLL site include the combinations of two applicable objects existing on one VLL site that are each SAPs.

Another combination of endpoint and SAP, SDP bindings supported on each VLL site includes two applicable objects existing on one VLL site that are both SDP bindings. This configuration corresponds to a switching node.

Figure 2:
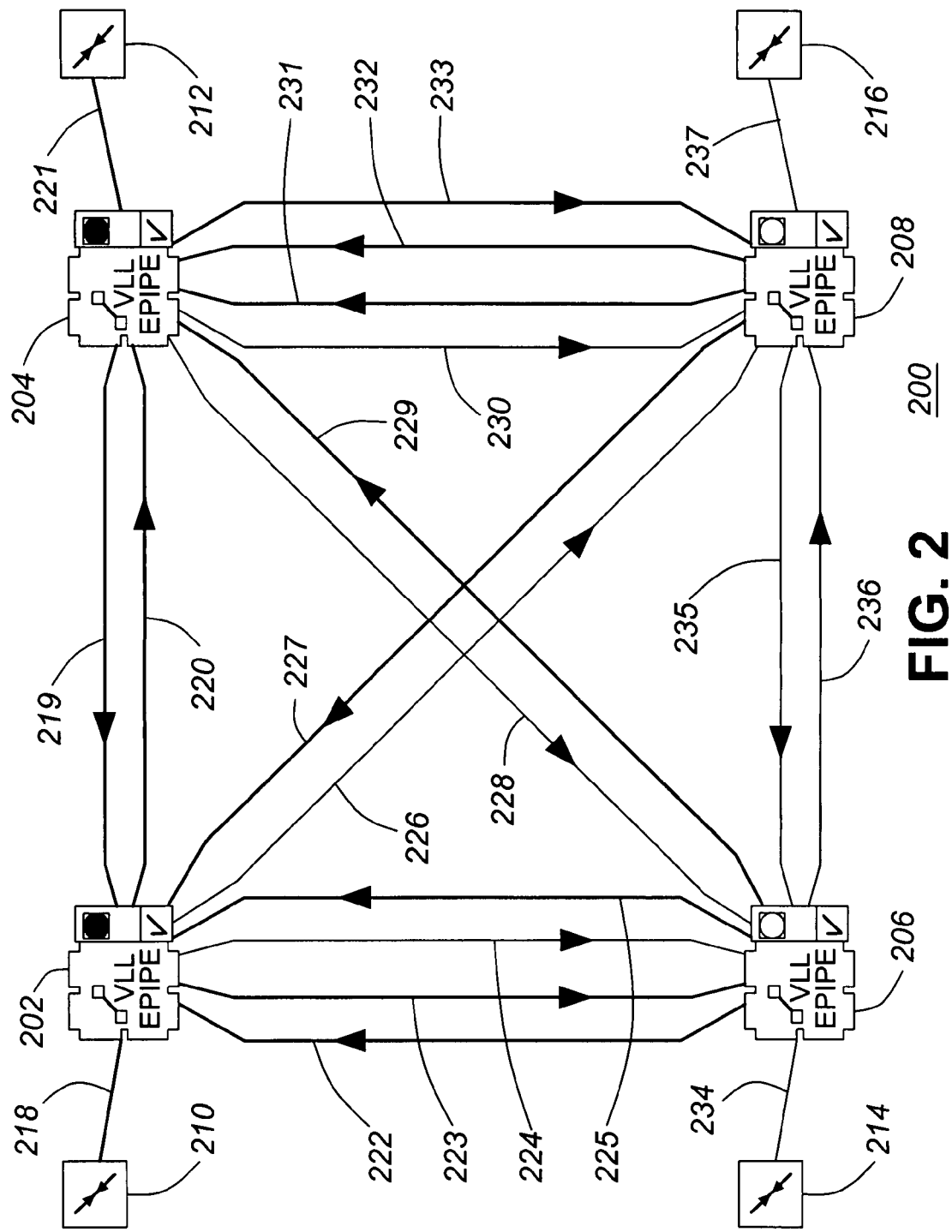
FIG. 2 shows a schematic diagram of an exemplary multi-chassis link aggregation group (MC-LAG) VLL before an exemplary switchover.

FIG. 2 shows an exemplary MC-LAG VLL 200 before an exemplary switchover. MC-LAG VLL 200 includes VLL 202, VLL 204, VLL 206 and VLL 208. In MC-LAG VLL 200, VLL 202, VLL 204, VLL 206 and VLL 208 are depicted as Epipe VLLs. MC-LAG VLL 200 further includes LAG 210, LAG 212, LAG 214 and LAG 216. In MC-LAG VLL 200, LAG 210, LAG 212, VLL 202 and VLL 204 are shown as active with traffic active via paths 218, 219, 220, 221, 222, 223, 225, 227, 229, 231, 232 and 233.

Figure 3:
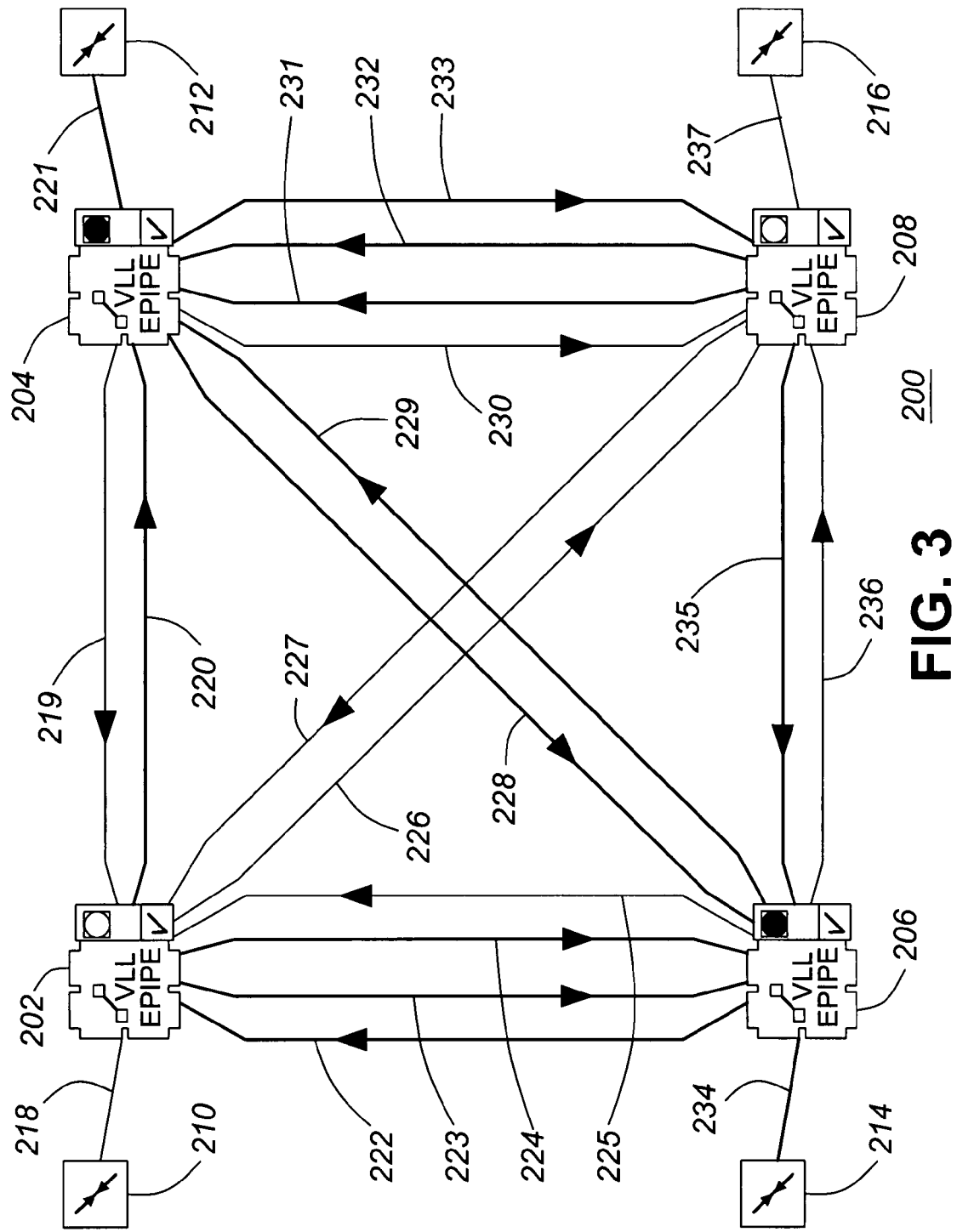
FIG. 3 shows the exemplary MC-LAG VLL of FIG. 2 after the exemplary switchover.

FIG. 3 shows exemplary MC-LAG VLL 200 after the exemplary switchover. The elements depicted in FIG. 3 are the same as the elements depicted in FIG. 2. However, in FIG. 3 traffic is depicted as flowing from LAG 214 to and from LAG 212 by way of VLL 206 and VLL 204 using active paths 220, 221, 222, 223, 224, 228, 229, 231, 232, 233, 234 and 235. It should be noted that paths 226, 230, 236 and 237 are not in use before the switchover as depicted in FIG. 2 or after the switchover as depicted in FIG. 3.

In accordance with the foregoing, a switching site is added to a regular VLL as follows. Two endpoints are created. One endpoint is on an access side and a second endpoint is on a network side. Next, an SAP is created. Then, an ICB binding is created between two nodes. This includes selecting a site and creating an SDP binding. Subsequently, the other ICB is created.

Next, the SDP binding is created on the network side endpoint. This is accomplished by selecting the network endpoint when creating or when updating the SDP binding. Then, a redundant SDP binding is created. This is accomplished by selecting the endpoint and creating the SDP binding. Then, the foregoing steps are repeated on other nodes.

After this, the system verifies that the protected pair of SAPs use the same MC-LAG. Likewise, the system verifies that the ICBs are pointing to the correct service sites.

It should be apparent that, the foregoing description can also be applied to Fpipe VLLs Apipe VLLs and Ipipe VLLs that support different encapsulation types for the SAP. In the system, the SAP encapsulation value verification is implemented either by preventing the system user from performing invalid configurations or by raising misconfiguration flags and/or alarms when the configuration was done through command line interface (CLI), a tool for interacting with computers.

The foregoing description of verification is also implemented in applications where the calculation is more complicated due to the presence of a more complex VLL service topology. In order to perform a validation, the VLL has to have two global endpoints (GE). Global endpoints are discussed in greater detail below. The verification is performed after the SAPs are divided into two global endpoints.

The SAP encapsulation value compatibility verification is performed when a new SAP is created. The SAP encapsulation value compatibility verification is also performed when a new SDP binding is created, assuming the topology is completed concurrent with, or prior to, the creation of the new SDP binding. The encapsulation values of all SAPs in the same global endpoint are the same.

In an example of the foregoing, there are two terminating Apipe sites A and B in the Apipe service. There isn't a pair of SDP Bindings between sites A and B. The system then configures two SAPs with frame relay (FR) encapsulation, even where FR to FR is not permitted for Apipe. A user then attempts to connect sites A and B by creating a pair of spoke SDP bindings. The system then rejects the attempted creation of the SDP binding and creates a validation message indicating that the encapsulation values are not compatible for the service.

In various exemplary embodiments of the system, the CE Inet address verification takes into account the more complex topology of Ipipe VLL services. In addition, in some embodiments, the configured CE Inet addresses of all SAPs in the same global endpoint is the same.

Following the foregoing, two GEs are determined. If the foregoing cannot be completed, an overall operational status indicator flag is set to indicate that the status is down. Otherwise, when the foregoing is completed, the overall operational status is indicated as being up by the overall operational status indicator flag.

When the overall operational status is up, the traffic is able to flow from one GE to the other GE and vice versa. In other words, there is at least one active path in each direction from one GE to the other that is operationally up. This is discussed further in connection with FIG. 4.

If the conditions described above are not satisfied, there is at least one direction that traffic is not able to pass. When this is the case, the overall operational status indicator will indicate that the service is down.

A path between two global endpoints begins with an SAP of one global endpoint. It may have zero or more SDP bindings therebetween. The path between two global endpoints then ends with an SAP on the other global endpoint. An active path between the global endpoints is a path where all SDP bindings are active. Such a path is unidirectional.

In addition to the foregoing description associated with an overall service operational status indicator flag, additional specific operation flags can be included. The specific operational flags are for individual components. Thus, the overall operational status can be up while any given operational flag associated with an individual component is down. This is true because of the existence of redundant paths within the system.

Examples of specific operational flags for individual components include an operational flag indicating whether a site is up or down, an operational flag indicating whether an SAP is up or down, and an operational flag indicating whether an SDP binding is up or down. The operational flag associated with the site indicates that the site is up when the SAP is up, one SDP binding on the network side is up, and the peer SDP binding status flags are clear. At least one site from each global endpoint must be up in order for the overall operational status to be up. The overall operational status flags and the specific operational flags for individual components are triggered automatically.

Figure 4:
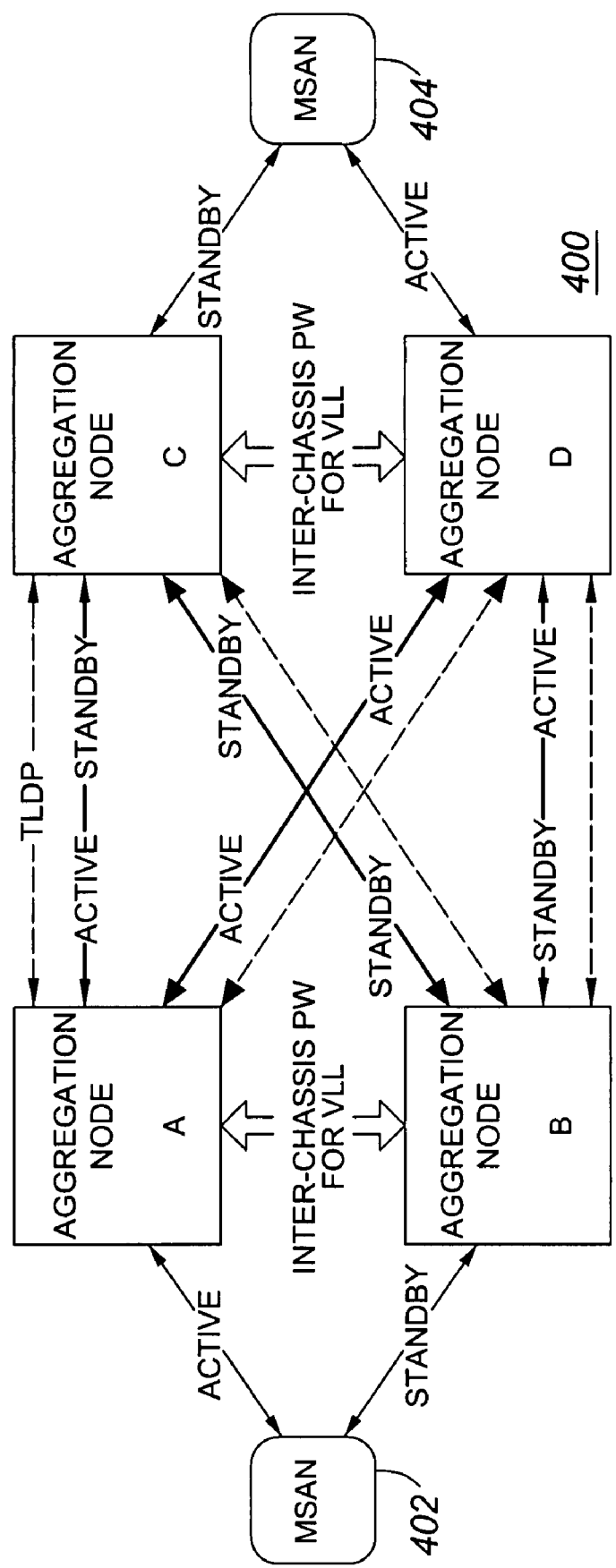
FIG. 4 shows a schematic diagram of an exemplary embodiment of VLL service end-to-end status.

Based on the foregoing, FIG. 4 is a schematic diagram 400 of an exemplary embodiment depicting the end-to-end status of a VLL service. Schematic diagram 400 shows the use of both MC-LAG in the access network and PW redundancy in the core network to provide an end-to-end VLL service to system users. As depicted, this service is resilient. According to the status indicated in diagram 400, the overall operational status flag between multi service access node (MSAN) 402 and MSAN 404 is up. This is true because an active path exists for traffic from MSAN 402 to aggregation node A, from aggregation node A to aggregation node D, and from aggregation node D to MSAN 404. Likewise, an active traffic path exists in the opposite direction from MSAN 404 to aggregation node D, from aggregation node D to aggregation node A, and from aggregation node A to MSAN 402.

The path from aggregation node B to aggregation node C is on standby. Likewise, the path from aggregation node C to aggregation node B is also on standby. Similarly, the paths in both directions between MSAN 402 and aggregation node B are on standby. It is also true, as depicted in end-to-end status diagram 400, that the paths between aggregation node C and MSAN node 404 are on standby in both directions.

The resiliency of the system depicted in schematic diagram 400 should be apparent. Specifically, a plurality of alternative paths from MSAN 402 to MSAN 404 exist. Likewise, a plurality of potential paths exist from MSAN 404 to MSAN 402.

Figure 5:
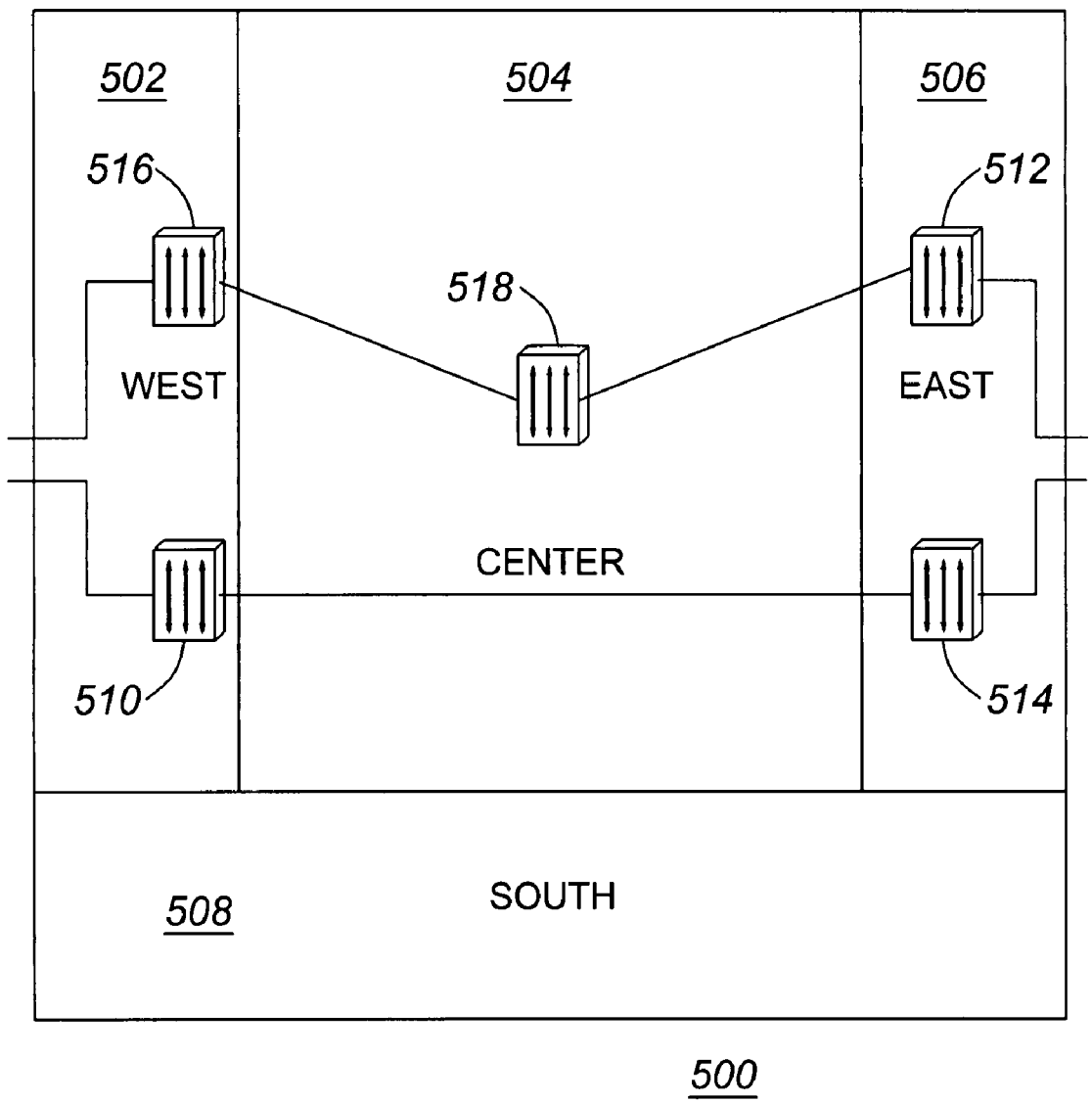
FIG. 5 shows a schematic diagram of an exemplary map of a topology distribution.

FIG. 5 shows a schematic diagram 500 of an exemplary map of a topology distribution. In a complete VLL service topology view, redundant PWs interconnect terminating sites at both ends with possible switching sites therebetween. To provide this information in logical groupings, the topology map for the feature can be subdivided. As depicted in exemplary diagram 500, the map area is subdivided into four subsections. These subsections are labeled as West 502, Center 504, East 506 and South 508.

In exemplary schematic diagram 500, East 502 and West 506 contain two groups of terminating sites. The East section 502 includes terminating sites 516 and 510. The West group 506 includes terminating sites 512 and 514. Of course, this also includes the SAPs and ICBs attached thereto. As depicted in exemplary schematic diagram 500, the Center area 504 includes all the PWs and switching sites expressed at 518. The South area 508 stores any remaining sites that may be dangling or otherwise cannot be part of a valid VLL instance.

A distribution of all entities in the depicted VLL instance is on a best effort basis. In other words, when the VLL instance does not have a valid topology that constitutes a complete graph, the sub-components of the VLL instance may have such a topology. Thus, under such conditions the sub-components of the VLL instance are processed as if they were individual VLL services by themselves. Further, when SAPs are missing but the rest of the topology provides sufficient information about the grouping of endpoints, then the related terminating sites are able to be positioned in the correct section of the topology.

Figure 6:
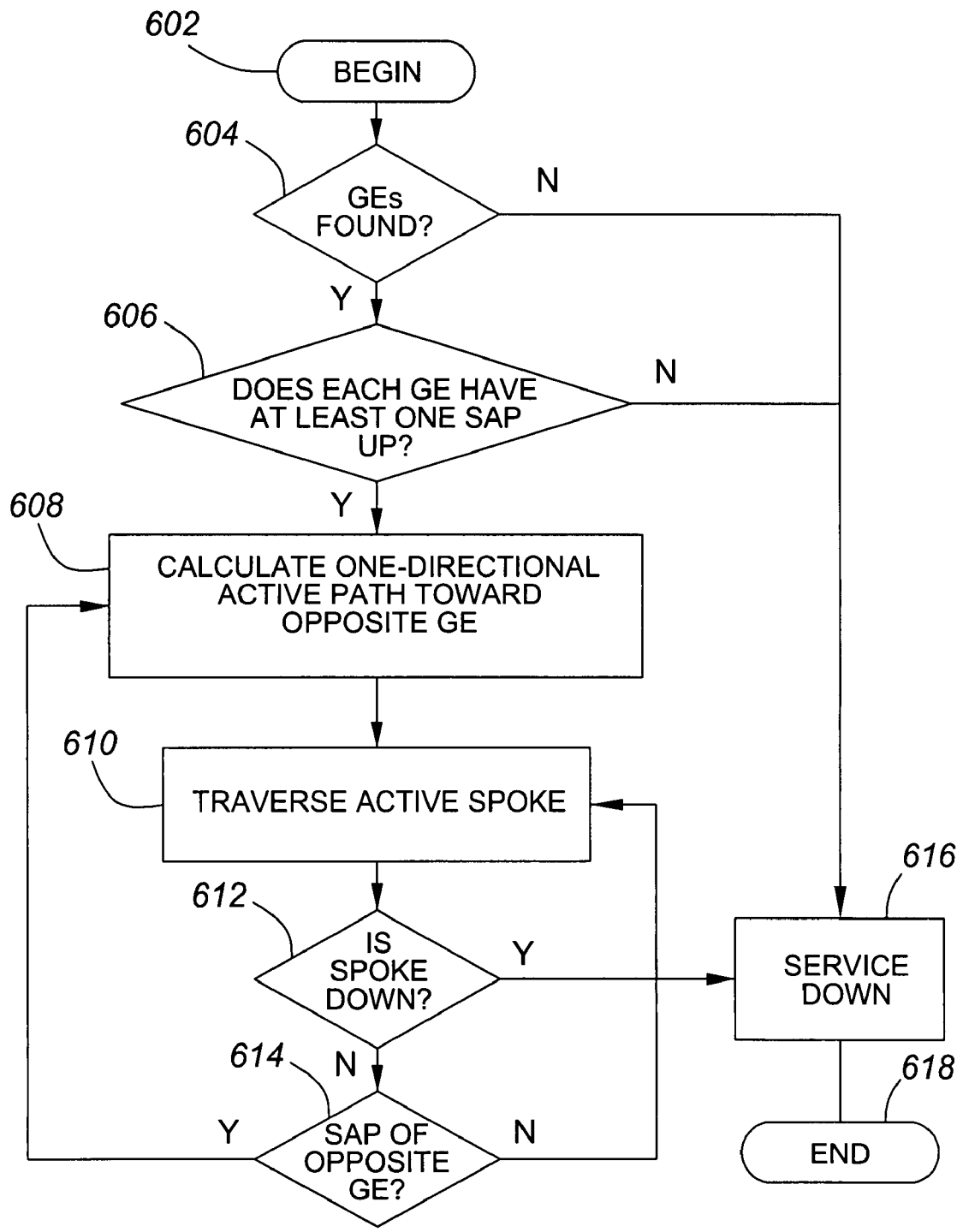
FIG. 6 shows a flow chart of an exemplary method of identifying global end points and connectivity of sites.

FIG. 6 shows an exemplary flow chart 600 of an exemplary embodiment of a method of identifying GEs and connectivity of sites. Exemplary method 600 begins in step 602. The method 600 then proceeds to exemplary step 604 where the two GEs are found. The two GEs are found based on the VLL topology. If the two GEs are not found, then the service is down and the method 600 proceeds to step 616. In step 616, the overall operational status indicator flag is set to down. If the two GEs are found, the method 600 proceeds to step 606.

In step 606, an evaluation is performed whether each GE has at least one active SAP that is operationally up. If a determination is made in step 606 that one of the GEs does not have any active and up SAPs, then the method 600 proceeds to step 616, and the overall operational status indicator flag is set to down. Alternatively, if a determination is made in step 606 that each GE has at least one active SAP, then the method 600 proceeds to step 608.

In step 608, a one-directional active path towards the opposite GE is calculated. This process begins from an active and up SAP found for one of the GEs in step 606. The path is calculated using a traversal algorithm. The traversal algorithm considers the different behavior of the switching traffic coming out of ICB spokes and non-ICB spokes. The traversal algorithm traverses active ICB spokes and active non-ICB spokes. This is similar to the traversal taken by the active traffic.

Thus, the method 600 proceeds to step 610 where an active spoke is traversed. Following traversal of an active spoke, the method 600 proceeds to step 612 where a determination is made whether the traversed active spoke is up or down. If a determination is made in step 612 that the traversed active spoke is down, the method 600 proceeds to step 616. Again, as previously mentioned, in step 616, the overall operational status indicator flag is set to down. If a determination is made in step 612 that the spoke is up, in other words not down, the method 600 proceeds to step 614.

In step 614, an evaluation is performed whether the active and up SAP found in step 606 for the opposite GE has been reached. If the active and up SAP of the opposite GE has not been reached, the method 600 returns to step 610 where the next active spoke is traversed.

If a determination is made in step 614 that the active and up SAP of the opposite GE has been reached, then the method 600 returns to step 608 and the one-directional path towards the first GE is calculated. The method 600 thus continues with the overall operational status flag set as up until a condition is encountered that brings the method 600 to step 616 where the overall operational status indicator flag is set to down. Once the overall operational status indicator flag is set to down, the method 600 then proceeds to step 618 where the method 600 ends.

It should be apparent that the method 600 is begun anew thereafter. The foregoing description represents a status calculation algorithm. The status calculation algorithm implements the search for the active end-to-end path.

To summarize the foregoing, a global endpoint is a set of local endpoints with SAP. The overall VLL service status assumes that two service endpoints exist. The overall VLL service status is up if there exists a path between the two service endpoints and at least one path in each direction is operational. The overall VLL service status is down if there exists a path between the two service endpoints in both directions but the path is not working in at least one of those directions.

The overall VLL service status is set to down when no path exists between the two service endpoints. In other words, the overall VLL service status is set to down when the two service endpoints are not connected.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A system for management of a redundant multi-segment pseudo-wire, comprising:
    an aggregated endpoint calculator that calculates a first aggregated endpoint and a second aggregated endpoint, each aggregated endpoint including two or more local endpoints, wherein at least one of the two or more local endpoints functions as a backup endpoint to establish redundancy, the two or more local endpoints having individual components;
    a plurality of nodes interconnected with one another and interconnected with the two or more local endpoints of each aggregated endpoint, the plurality of nodes having individual components;
    an overall system status indicator that indicates the overall system is up by determining that each aggregated endpoint has at least one active service access point (SAP) when a first one-directional active path exists for traffic from the first aggregated endpoint to the second aggregated endpoint and a second one-directional active path exists for traffic from the second aggregated endpoint to the first aggregated endpoint; and
    a plurality of individual component operational status indicators associated with the individual components, each individual component operational status indicator indicating whether the associated individual component is operating properly.

2. The system for the management of the redundant multi-segment pseudo-wire according to claim 1, wherein each individual component is selected from a list consisting of sites, service access points, and service distribution point bindings.

3. The system for the management of the redundant multi-segment pseudo-wire according to claim 1, wherein the first and second aggregated endpoints calculated by the aggregate endpoint calculator do not change when traffic is switched from an active local endpoint to one of the two or more local endpoints that is the backup endpoint.

4. The system for the management of the redundant multi-segment pseudo-wire according to claim 3, wherein one or more of the operational status indicators are changed when a traffic path is switched to bypass an individual component in response to the operational status indicator associated with that individual component indicating that the individual component is not operating properly.

5. The system for the management of the redundant multi-segment pseudo-wire according to claim 1, further comprising:
    a system mapper that maps the first and second aggregated endpoints and the plurality of nodes.

6. The system for the management of the redundant multi-segment pseudo-wire according to claim 5, wherein the system mapper maps at least four discrete and identifiable areas, two areas that respectively include the first and second aggregated endpoints, a third area that includes the redundant multi-segment pseudo-wire and includes individual components that are switching sites, and a fourth area that includes content not mapped in any other area of the at least four discrete and identifiable areas.

7. A method of managing a redundant and multi-segment pseudo-wire, comprising:
    calculating first and second aggregated endpoints, each aggregated endpoint including two or more local endpoints, wherein at least one of the two or more local endpoints functions as a backup endpoint to establish redundancy, the two or more local endpoints having individual components;
    mapping the first and second aggregated endpoints and a plurality of nodes interconnected with one another and interconnected with the two or more local endpoints of each aggregated endpoint, the plurality of nodes having individual components;
    determining an overall status of a system, the overall status of the system indicating an up state when a functional path exists in both directions for traffic from the first aggregated endpoint to the second aggregated endpoint, the determining step further comprising;
        finding the first aggregated endpoint:
        finding the second aggregated endpoint;
        evaluating whether each aggregated endpoint has at least one active service access point (SAP):
        calculating a first one-directional active path from the first aggregated endpoint to the second aggregated endpoint;
        calculating a second one-directional active path from the second aggregated endpoint to the first aggregated endpoint;

setting an overall system status indicator to indicate the determined overall status of the system;

determining an operational status of each of the plurality of individual components, the operational status indicating an up state when the individual components are operating properly; and setting a plurality of individual component operational status indicators associated with the individual components, each individual component operational status indicator indicating whether the associated individual component is operating properly.

8. The method of managing the redundant and multi-segment pseudo-wire according to claim 7, wherein the step of calculating the one-directional active path from the first aggregated endpoint to the second aggregated endpoint further comprises:

traversing an active spoke;

determining that the traversed active spoke is up;

evaluating whether an active and up service access point for the second aggregated endpoint has been reached; and determining that the active and up service access point of the second aggregated endpoint has been reached.

9. The method of managing the redundant and multi-segment pseudo-wire, according to claim 7, wherein the step of calculating the one-directional active path from the first aggregated endpoint to the second aggregated endpoint begins from an active and up service access point found for the first aggregated endpoint, and further comprises:

traversing active inter-chassis backup spokes and active non-inter-chassis backup spokes.

10. The method of managing the redundant and multi-segment pseudo-wire, according to claim 7, wherein the step of finding the first and second aggregated endpoints is performed based on a virtual leased line topology.

11. The method of managing the redundant and multi-segment pseudo-wire, according to claim 7, wherein each individual component is selected from a list consisting of sites, service access points, and service distribution point bindings.

12. The method of managing the redundant and multi-segment pseudo-wire, according to claim 7, wherein a topology of the first and second aggregated endpoints does not change when traffic is switched from an active local endpoint to one of the two or more local endpoints that is the backup endpoint.

13. The method of managing the redundant and multi-segment pseudo-wire, according to claim 7, further comprising:

monitoring and calculating a changed path when a change in a traffic path occurs to bypass an individual component in response to a determination that the individual component is not operating properly.

14. The method of managing the redundant and multi-segment pseudo-wire, according to claim 7, further comprising:

mapping the first and second aggregated endpoints and the plurality of nodes.

15. The method of managing the redundant and multi-segment pseudo-wire, according to claim 14, wherein the mapping includes mapping at least four discrete and identifiable areas, two areas that respectively include the first and second aggregated endpoints, a third area that includes the multi-segment pseudo-wire and includes individual components that are switching sites, and a fourth area that includes content not mapped in any other area of the at least four discrete and identifiable areas.

\* \* \* \* \*